US008611232B2

United States Patent
Xu et al.

(10) Patent No.: US 8,611,232 B2
(45) Date of Patent: *Dec. 17, 2013

(54) METHOD OF SIMPLE AND EFFICIENT FAILURE RESILIENT LOAD BALANCING

(71) Applicant: AT&T Intellectual Property I, L.P., Atlanta, GA (US)

(72) Inventors: Dahai Xu, Livingston, NJ (US); Robert Doverspike, Tinton Falls, NJ (US); David Johnson, Madison, NJ (US); Jennifer Rexford, Princeton, NJ (US); Martin Suchara, Berkeley, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/787,978

(22) Filed: Mar. 7, 2013

(65) Prior Publication Data
US 2013/0182561 A1    Jul. 18, 2013

(51) Int. Cl.
*H04L 12/26*    (2006.01)
(52) U.S. Cl.
USPC .......................... 370/248; 370/225; 370/252
(58) Field of Classification Search
USPC ......... 370/216, 218, 225, 227–228, 241–242, 370/248, 250, 252
See application file for complete search history.

(56) References Cited

U.S. PATENT DOCUMENTS

| 7,864,751 | B2  |   | 1/2011 | Greenberg |
|-----------|-----|---|--------|-----------|
| 8,027,245 | B2  | * | 9/2011 | Kodialam et al. ............. 370/216 |
| 8,175,006 | B2  |   | 5/2012 | Lee et al. |
| 8,477,597 | B2  | * | 7/2013 | Zhang et al. .................. 370/217 |
| 2003/0131131 | A1 | * | 7/2003 | Yamada et al. ............... 709/238 |
| 2013/0028070 | A1 | * | 1/2013 | Beheshti-Zavareh et al. ............................ 370/217 |

OTHER PUBLICATIONS

E. Dinan, D. Awduche, and B. Jabbari, "Analytical framework for dynamic traffic partitioning in MPLS networks," in IEEE International Conference on Communications, vol. 3, pp. 1604-1608, 2000.
Y. Seok, Y. Lee, Y. Choi, and C. Kim, "Dynamic constrained multipath routing for MPLS networks," in International Conference on Computer Communications and Networks, pp. 348-353, 2001.
Y. Lee, Y. Seok, Y. Choi, and C. Kim, "A constrained multipath traffic engineering scheme for MPLS networks," in IEEE International Conference on Communications, vol. 4, pp. 2431-2436, 2002.
A. Elwalid, C. Jin, S. Low, and I. Widjaja, "MATE: MPLS adaptive traffic engineering," in Proceedings of INFOCOM, vol. 3, pp. 1300-1309, 2001.
J. Wang, S. Patek, H. Wang, and J. Liebeherr, "Traffic engineering with AIMD in MPLS networks," in IEEE International Workshop on Protocols for High Speed Networks, pp. 192-210, 2002.

(Continued)

*Primary Examiner* — Michael Thier
*Assistant Examiner* — Feben M Haile

(57) ABSTRACT

A resilient load balancing method uses fixed paths and a fixed path-splitting strategy to enable ingress routers to efficiently reroute traffic after a failure. An off-line management system computes a set of fixed paths and a set of splitting ratios for routing demand from ingress routers to egress routers, with sufficient capacity to meet demands under each failure scenario. That data is then used by the ingress router to reroute demand after observing a failure.

20 Claims, 10 Drawing Sheets

(56) References Cited

OTHER PUBLICATIONS

D. Wang and G. Li, "Efficient distributed bandwidth management for MPLS fast reroute," IEEE/ACM Trans. Netw., vol. 16, No. 2, pp. 486-495, 2008.

M. Kodialam and T. V. Lakshman, "Dynamic routing of restorable bandwidth-guaranteed tunnels using aggregated network resource usage information," IEEE/ACM Trans. Netw., vol. 11, No. 3, pp. 399-410, 2003.

G. Li, D. Wang, C. Kalmanek, and R. Doverspike, "Efficient distributed restoration path selection for shared mesh restoration," IEEE/ACM Trans. Netw., vol. 11, No. 5, pp. 761-771, 2003.

Y. Liu, D. Tipper, and P. Siripongwutikorn, "Approximating optimal spare capacity allocation by successive survivable routing," IEEE/ACM Trans. Netw., vol. 13, No. 1, pp. 198-211, 2005.

H. Saito, Y. Miyao, and M. Yoshida, "Traffic engineering using multiple multipoint-to-point LSPs," in Proceedings of INFOCOM, vol. 2, pp. 894-901, 2000.

B. A. Movsichoff, C. M. Lagoa, and H. Che, "End-to-end optimal algorithms for integrated QoS, traffic engineering, and failure recovery," IEEE/ACM Trans. Netw., vol. 15, pp. 813-823, Nov. 2007.

C. M. Lagoa, H. Che, and B. A. Movsichoff, "Adaptive control algorithms for decentralized optimal traffic engineering in the Internet," IEEE/ACM Trans. Netw., vol. 12, No. 3, pp. 415-428, 2004.

A. Tomaszewski, M. Pioro, and M. Zotkiewicz, "On the complexity of resilient network design," Networks, 2009.

D. Coudert, P. Datta, S. Perennes, H. Rivano, and M.-E. Voge, "Shared risk resource group: Complexity and approximability issues," Parallel Processing Letters, vol. 17, No. 2, pp. 169-184, 2007.

S. Fortune, J. Hopcroft, and J. Wyllie, "The directed subgraph homeomorphism problem," Theor. Comput. Sci., vol. 10, No. 2, pp. 111-121, 1980.

\* cited by examiner

FIG. 2

| VARIABLE | DESCRIPTION |
| --- | --- |
| $G(V,E)$ | network with vertices $V$ and directed edges $E$ |
| $c_e$ | capacity of edge $e \in E$ |
| $y_e$ | propagation delay on edge $e \in E$ |
| $S$ | family of network failure states |
| $s$ | network failure state (set of failed links) |
| $w^s$ | weight of network failure state $s \in S$ |
| $D$ | set of demands |
| $u_d$ | source of demand $d \in D$ |
| $v_d$ | destination of demand $d \in D$ |
| $h_d$ | flow requirement of demand $d \in D$ |
| $P_d$ | paths available to demand $d \in D$ |
| $\alpha_p$ | fraction of the demand assigned to path $p$ |
| $\alpha_p^o$ | fraction of the demand assigned to path $p$ for observable failure state $o$ |
| $O_d$ | family of observable failure states for node $u_d$ |
| $o_d(s)$ | state observable by $u_d$ in network failure state $s \in S$ |
| $P_d^o$ | paths available to $u_d$ in observable failure state $o \in O_d$ |
| $f_p^s$ | flow on path $p$ in network failure $s \in S$ |
| $f_p^o$ | flow on path $p$ in observable failure state $o \in O_d$ |
| $l_e^s$ | total flow on edge $e$ in network failure state $s$ |
| $l_{e,d}^s$ | flow of demand $d$ on edge $e$ in network failure state $s$ |

| Name | Topology | Nodes | Edges | Demands |
|------|----------|-------|-------|---------|
| hier50a | hierarchical | 50 | 148 | 2.450 |
| hier50b | hierarchical | 50 | 212 | 2.450 |
| rand50 | random | 50 | 228 | 2.450 |
| rand50a | randow | 50 | 245 | 2.450 |
| rand100 | randow | 100 | 403 | 9,900 |
| wax50 | Waxman | 50 | 169 | 2.450 |
| wax50a | Waxman | 50 | 230 | 2.450 |
| abilene | backbone | 11 | 28 | 253 |
| tier-1 | backbone | 50 | 180 | 625 |

SYNTHETIC AND REALISTIC NETWORK TOPOLOGIES.

FIG. 9

| Algorithm | Single dege avg (ms) | failures stdev | SRLG avg (ms) | failures stdev |
| --- | --- | --- | --- | --- |
| optimum | 30.99 | 0.23 | 31.06 | 0.21 |
| State dep. splitting | 30.86 | 0.21 | 30.99 | 0.16 |
| State indep. splitting | 31.00 | 0.23 | 31.14 | 0.21 |
| Equal splitting | 33.82 | 0.22 | 39.53 | 0.41 |
| OSPF (optimized) | 30.70 | 0.54 | 30.71 | 0.53 |
| OSPF (current) | 28.45 | 0 | 28.49 | 0 |

PROPAGATION DELAY
(AVERAGE AND STANDARD DEVIATION)
IN THE TIER-1 BACKBONE NETWORK

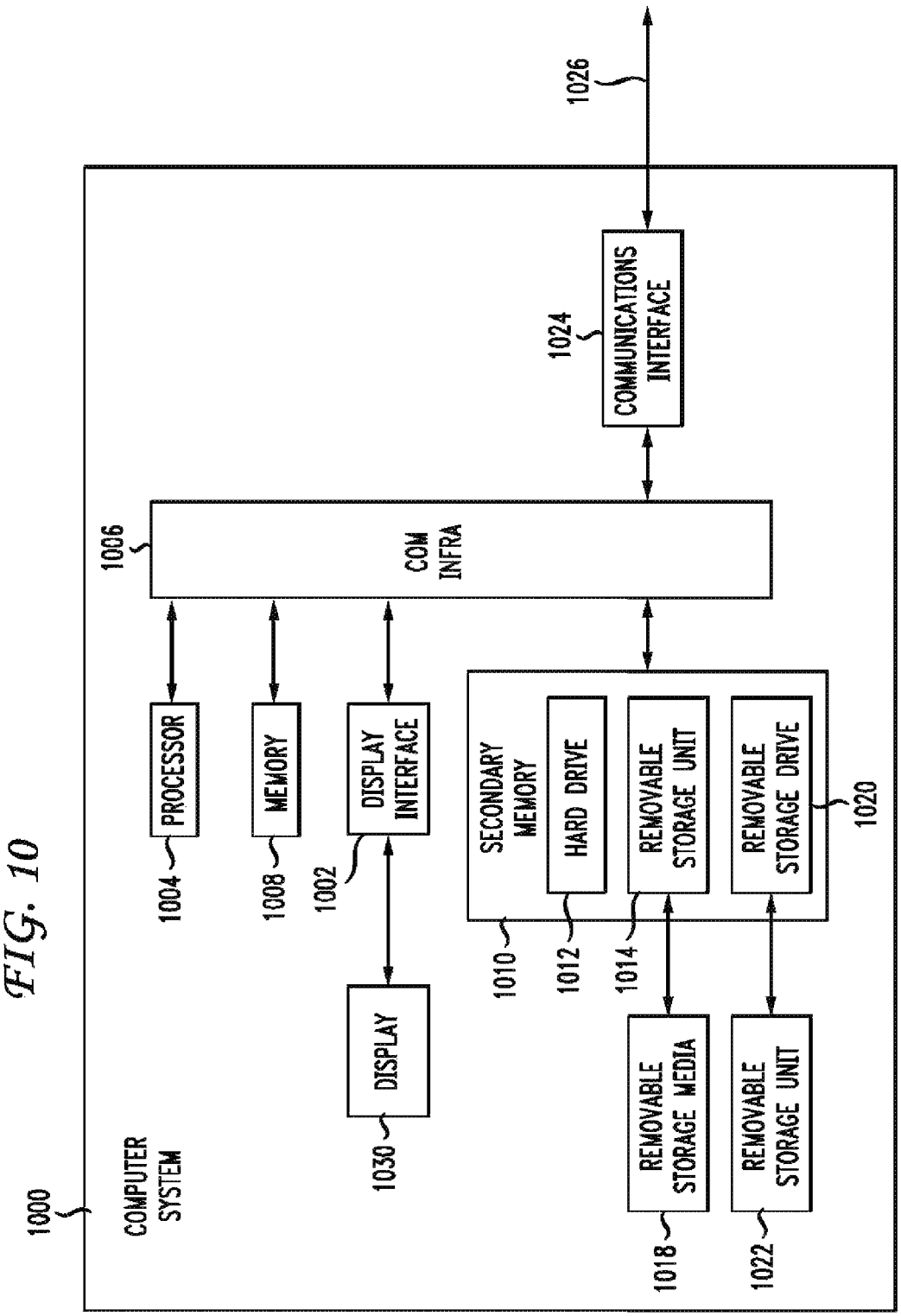

METHOD OF SIMPLE AND EFFICIENT FAILURE RESILIENT LOAD BALANCING

CROSS-REFERENCE TO RELATED APPLICATIONS

This application is a continuation application of U.S. patent application Ser. No. 12/653,475, filed Dec. 15, 2009, entitled "Method of Simple and Efficient Failure Resilient Load Balancing," which is incorporated herein by reference in its entirety.

FIELD OF THE DISCLOSURE

The present disclosure relates generally to networking and networking architecture, and more particularly, to combining path protection and traffic engineering for providing fast recovery time when network failures are detected, thereby assuring reliable data delivery and balanced load handling.

BACKGROUND

Distributed computing networks, such as the Internet, comprise a vast number of routers and links connecting Network Access Devices (NADs). Routers are the electronic devices used to connect NADs to each other, or more likely to private or public networks. Links are the medium used to make the connection between routers, and ultimately users of a network. Examples of links are Ethernet cable, coaxial cable, Digital Subscriber Line, fiber-optic cable and a plurality of wireless technologies, just to name a few. The arrangement of routers and links, combined with support technologies and hardware, allows almost any machine (e.g. client, server, etc.) to access any machine in the same network. The exact path that a network communication session takes, i.e. the specific routers and links traversed, is flexible and may be determined by the Network Management System (NMS), and chosen depending on a variety of conditions, including proximity, availability and speed.

As a network system is comprised of a plurality of complex and delicate opto-electro-mechanical components or devices, network failures are inevitable. These failures may be caused by software or firmware failures, hardware failures, and/or human error (e.g. unplugging a card from a slot or an accidental fiber or cable break). Therefore, planning for failure recovery in a network is an essential part of network design, deployment and operations. Failure recovery is a challenging problem, as traffic must quickly be re-routed and load balanced when a failure is detected, often resulting in significant path restructuring. Network service providers frequently have Service Level Agreements (SLAs) with large network users, which clearly define network availability and performance requirements to be met.

There thus exists a need for networks having fast recovery times when network failures are detected, thereby assuring reliable data delivery and balanced load handling.

SUMMARY OF THE DISCLOSURE

In accordance with a first aspect of the disclosure, a method is provided for balancing load in a network after failure of a link. The network includes a plurality of interconnected vertices and edges e∈E and a set of traffic demands d∈D. Each demand d defines a flow requirement $h_d$ from an ingress router $u_d$ to an egress router $v_d$. The network additionally includes a set of failure states s.

At an ingress router $u_d$, traffic is routed by automatically balancing traffic load over a predefined set of paths $P_d$ from the ingress router $u_d$ to the egress router $v_d$ according to a set of splitting ratios $\alpha_p^o$. Each splitting ratio defines a fraction of the demands d to be transmitted over a path p of the set of paths $P_d$ in a case of a detectable failure state o corresponding to a subset of a set of modeled failure states s. The set of modeled failure states are states that cause at least one path p of the predefined set of paths $P_d$ to fail. The set of modeled failure states includes a no-failure state in which the network has no failures. Each modeled failure state has at least a predetermined probability of occurrence.

The predetermined probability of occurrence may be sufficient to meet a predetermined network availability objective when the network is restored against the set of modeled failure states.

The method may also include pre-computing, in an off-line management system, the paths $P_d$ and splitting ratios $\alpha_p^o$. The step of pre-computing the fixed paths $P_d$ may comprise obtaining an optimal flow on each edge for all modeled failure states s; and using a decomposition algorithm to compute the corresponding fixed paths $P_d$ through the network.

The step of pre-computing the splitting ratios $\alpha_p^o$ may include solving a linear program wherein the following objective function is minimized:

$$\mathrm{obj}(l_{e_1}^{s_1}/c_{e_1}, \ldots) = \Sigma_{s \in S} w^s \Sigma_{e \in E} \Phi(l_e^s/c_e).$$

wherein $l_{e_1}^{s_1}$ is a total flow on edge $e_1$ in failure state $s_1$, $c_{e_1}$ is a capacity of an edge $e_1$, $w^s$ is a weight given to a failure state s based on a frequency of occurrence, and $\Phi$ is a convex function of link load. The objective function may be subject to the following constraints:

$$l_e^s = \sum_{d \in D} \sum_{p \in P_d^o, e \in p} f_p^o \quad \forall\, e, s, o = o_d(s);$$

$$h_d = \sum_{p \in P_d^o} f_p^o \quad \forall\, d, o \in O_d; \text{ and}$$

$$0 \leq f_p^o \quad \forall\, d, o \in O_d, p \in P_d;$$

wherein $l_e^s$ is a total flow on edge e in network failure state s, $P_d^o$ is a set of paths for demand d and detectable failure state o, $f_p^o$ is a flow on path p in detectable failure state o; and $O_d$ is a set of all detectable failure states for the ingress router $u_d$.

The objective function may alternatively be subject to the following constraints:

$$f_p^o = h_d \frac{\alpha_p}{\sum_{p \in P_d^o} \alpha_p} \quad \forall\, d, o \in O_d, p \in P_d;$$

$$l_e^s = \sum_{d \in D} \sum_{p \in P_d^o, e \in p} f_p^o \quad \forall\, e, s, o = o_d(s);$$

$$h_d = \sum_{p \in P_d^o} f_p^o \quad \forall\, d, o \in O_d; \text{ and}$$

$$0 \leq f_p^o \quad \forall\, d, o \in O_d, p \in P_d;$$

wherein $f_p^o$ is a flow on path p in detectable failure state o, $P_d^o$ is a set of paths for demand d and detectable failure state o, $O_d$ is a set of all detectable failure states for the ingress router $u_d$, and $l_e^s$ is a total flow on edge e in network failure state s.

Solving the objective function may additionally include finding a splitting ratio $\alpha_p$ for each path p as $$\alpha_p = \sum_{s \in S} \frac{w^s f_p^s}{h_d}$$

wherein $f_p^s$ is an optimal flow for path p in failure state s.

The set of fixed paths $P_d$ and the set of splitting ratios may be stored at the ingress router $u_d$ by populating at least one forwarding table in the ingress router. Alternatively, the set of fixed paths $P_d$ and the set of splitting ratios may be stored by configuring the ingress router to signal the paths using a resource reservation protocol.

Another embodiment of the invention is a computer-usable medium having computer readable instructions stored thereon for execution by one or more processors to perform the methods described above.

These aspects of the disclosure and further advantages thereof will become apparent to those skilled in the art as the present disclosure is described with particular reference to the accompanying drawings.

BRIEF DESCRIPTION OF THE DRAWINGS

FIG. 2 shows the Summary of Notation used later in the present disclosure;

FIG. 3 shows the synthetic and realistic network topologies used in experimental evaluations;

FIG. 4 shows the traffic engineering objective in the hierarchical topology hier 50a;

FIG. 9 shows the propagation delays in the tier-1 backbone network; and

FIG. 10 is a schematic of an exemplary computer system 1000 for implementing the functionality of the present disclosure.

DETAILED DESCRIPTION OF THE DISCLOSURE

Embodiments of the disclosure will be described with reference to the accompanying drawing figures wherein like numbers represent like elements throughout. Before embodiments of the disclosure are explained in detail, it is to be understood that the disclosure is not to be limited in its application to the details of the examples set forth in the following description and/or illustrated in the figures. The disclosure is capable of other embodiments and of being practiced or carried out in a variety of applications. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

In the most general sense, the present disclosure considers path protection and traffic engineering together to develop an optimal failure recovery plan. This is in contrast to most existing methods which consider them separately. The fast failure-recovery mechanism disclosed herein offers nearly optimal load balancing while using a static set of paths. Multipath routing between each pair of ingress and egress routers is utilized. Such end-to-end routing has several benefits. First, these routes do not need to change when a failure is detected, which saves time, reduces overhead, and improves path stability. Second, end-to-end load balancing spreads the traffic in the network more effectively than local rerouting. Third, it enables faster recovery and lower protocol overhead than conventional link-state routing protocols, like Open Shortest Path First (OSPF), which not only rely on flooding link-state advertisements and re-computing shortest paths but also suffer from transient forwarding loops. A fourth benefit is the solution's simplicity; most of the functionality is incorporated in the Network-Management Software (NMS) rather than the network elements. The NMS is responsible for selecting the end-to-end paths and calculating the path-splitting parameters for each router. The solution has a minimalist control plane, used only for failure detection, which leads naturally to a simpler network where smart, expensive routers are replaced with cheaper routers and/or switches with a limited feature set.

Load Balancing Over Multiple Static Paths

The network architecture of the present disclosure addresses the following needs: (1) to make network management easier and enable the use of simpler, cheaper routers, (2) to balance the network traffic load before, during, and after failures to make efficient use of network resources, and (3) to detect and respond to failures quickly to ensure uninterrupted service.

Figure 1:
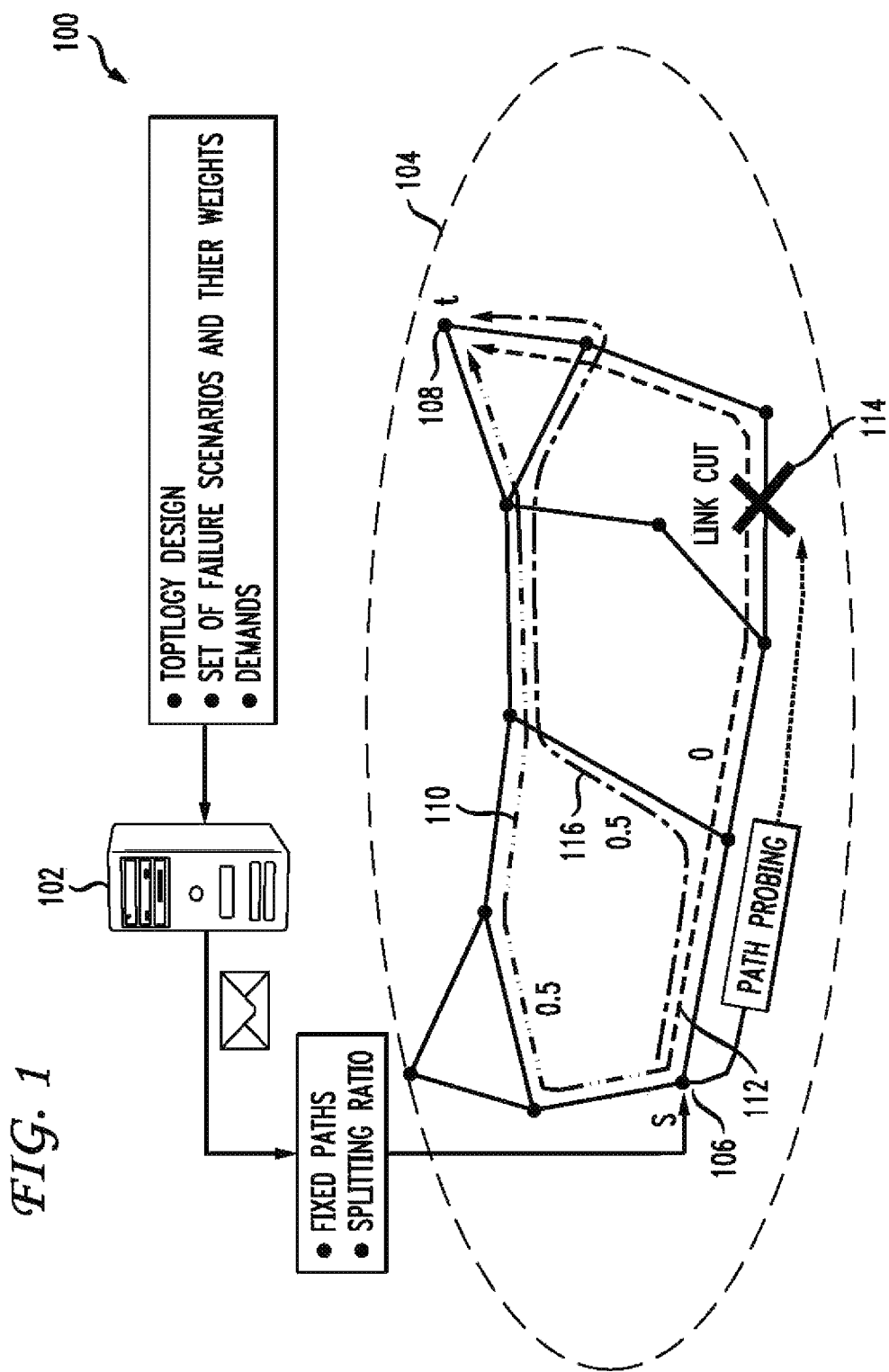
FIG. 1 is a schematic of exemplary network architecture in accordance with the present disclosure.

FIG. 1 is a schematic of exemplary network architecture 100 in accordance with the present disclosure. NMS 102 manages network 104, which is responsible for traffic flow between routers s 106 and t 108. Three inputs of the NMS 102 are (1) fixed topology, (2) the set of failure scenarios and their weights, and (3) traffic demands. These inputs will be discussed in greater detail elsewhere in the disclosure. Under normal operating conditions, traffic is sent via paths 110 and 112. The NMS may observe a link cut using active path probing or other techniques. Once NMS 102 has detected a link cut, such as represented by 114, traffic is immediately redistributed to the remaining paths, in this example via paths 110 and 116, based on their static configuration. This simplifies network management, reduces router cost, and removes dynamic state from the routers.

Flexible Load Balancing Over Pre-established Paths

The network architecture of the present disclosure uses multiple paths between each ingress-egress router pair in the network. Using pre-established end-to-end paths allows fast failure recovery as the ingress router can shift the load away from the failed paths, avoiding dynamic path recalculation. Using multiple paths also allows the ingress router to balance the load in the network which helps to reduce network traffic congestion. By utilizing this architecture, the ingress router has a simple static configuration that determines the traffic-splitting ratios among the available paths, while intermediate routers merely forward packets over pre-established paths. As a result, the router is a much simpler device that does not need to collect congestion feedback, participate in a routing protocol, interact with the management system upon failure detection, or solve any computationally difficult problems.

Multiprotocol Label Switching (MPLS) is a mechanism utilized in telecommunications networks which directs and carries data from one network node to the next. In this regard, flexible traffic splitting is already supported by major router vendors Juniper Networks and Cisco Systems, and many others. Such existing routers can be configured to hash packets based on port and address information in the headers into several groups and forward each group on a separate path. This can provide path splitting with relatively fine granularity (e.g., at the 1/16th level), while ensuring that packets belonging to the same flow traverse the same path. In a data center, the end-host servers could encapsulate the packets, as discussed in the paper by A. Greenberg, et al. "VL2: A scalable and flexible data center network", *Proceedings of ACM SIG-COMM*, 2009, and incorporated herein by reference, and choose encapsulation headers that split the traffic over the multiple paths with the desired splitting ratios. This further reduces the complexity of the network elements, and also enables finer-grain traffic splitting than today's routers provide.

Path-level Failure Detection and Notification

The ingress router uses a path-level failure-detection mechanism to avoid sending traffic on a failed path. This mechanism could be implemented, e.g., using Bidirectional Forwarding Detection (BFD) as discussed in the paper by D. Katz and D. Ward, "Bidirectional forwarding detection", *IETF Internet Draft*, February, 2009, and incorporated herein by reference. BFD establishes sessions between the ingress-egress router pairs to monitor each of the paths. BFD piggybacks on existing traffic and obviates the need to send "hello" messages. Utilizing this approach, the ingress router receives a faster failure notification than would be possible using a routing protocol's own local keep-alive mechanism, and the packets are handled by the hardware interfaces, thereby not utilizing the router's CPU time. Although the ingress router doesn't learn which link failed, knowledge of end-to-end path failures is sufficient to avoid using the failed path. Additionally, this architecture does not require the routers to be aware of the network topology, therefore no control protocol is needed to exchange topology information. A backwards-compatible realization of the architecture can leverage finer-grain topology information. For example, MPLS-capable routers can be configured to learn about link failures from the interior gateway protocol (e.g., OSPF, and others). If no alternate routes are specified for the affected path(s), the router can simply renormalize the outgoing traffic on the remaining available paths.

Offline Route Optimizations in the NMS

Given a static network topology, shared-risk information (i.e., sets of links with a shared vulnerability), and traffic matrix (i.e., volume of exchanged traffic between each ingress-egress router pair), the NMS can calculate multiple diverse paths so that at least one of them works for each failure scenario; this is possible as long as no failure partitions the ingress-egress router pair. Moreover, the paths can be chosen, providing traffic load balancing in the network. These two goals are complementary as both require path diversity. After computing the paths and associated traffic-splitting parameters, the NMS can install them either by populating forwarding tables in the routers or by configuring the ingress routers to signal the paths using a protocol like RSVP.

The NMS has access to the network topology and anticipated traffic demands. With this information, the network operator can provide the NMS with a list of potential or planned failures; correlated link failures can be determined by considering sets of links that share a common vulnerability as discussed in the paper by I. P. Kaminow and T. L. Koch, "*The Optical Fiber Telecommunications IIIA*", New York: Academic Press 1997, and incorporated herein by reference. Many failures in ISP backbones are planned in advance, or involve a single link, and most of these failures are short lived.

The network architecture solution of the present disclosure allows the network to continue directing traffic over the working paths, without incurring any protocol overheads to "withdraw" or re-compute paths; instead, the failed paths remain in the forwarding tables, ready to be used upon recovery. Since the network configuration is completely static, the NMS can calculate paths and splitting parameters offline, and change them only in response to significant traffic shifts or the planned long-term addition or removal of equipment.

Network Model and Optimization Objective

The NMS can solve an offline optimization problem to select the paths and splitting ratios for each ingress-egress pair. The exact formulation of the optimization problem depends on how the network elements represent and use the splitting ratios. The common aspects of the problem formulation are presented: (1) a description of how the network topology, traffic demands, failure scenarios, and end-to-end paths are modeled, (2) the objective to be optimized by the NMS.

Topology, Failure Scanarios, Traffic Demands, and Paths

The NMS has several inputs, including (1) fixed topology, (2) the set of failure scenarios and their weights, and (3) traffic demands.

FIG. 2 shows a Summary of Notation 200 used later in the present disclosure.

Fixed topology: The topology is represented by a graph G(V,E) with a set of vertices V and directed edges E. The capacity of edge $e \in E$ is denoted by $c_e$, and the propagation delay on the edge by $y_e$.

The set of failure scenarios: The failure scenarios are denoted by the set S, where each $s \in S$ consists of a set of edges that may fail together. For example, a router failure can be represented by the set of its incident links, a fiber cut can be represented by all links in the affected fiber bundle, and the failure-free case can be represented by the empty set Ø. For simplicity, all demands are assumed to remain connected for each failure; alternatively, a demand can be omitted for each failure case that disconnects it.

The set of failure scenarios S is a well defined "set" of "subsets" of links or nodes that are modeled for network restoration and resulting network availability. That is, these subsets of links and nodes are the deterministic failures that we want to assess how the network responds against. Of course, any subset has a non-zero probability of simultaneous failure, but because of the monstrous size of "all" subsets, for practicality the set is usually restricted to the most probable. The most probable are typically potential single upper layer failures (the individual links and nodes (singleton sets)) and in addition potential failure of a single link or node in a lower layer network. Because multiple links at the upper layer network of interest can route over a single lower layer link, a lower layer failures causes simultaneous failure of multiple upper layer links. Such groups of links are sometimes called "shared risk groups."

Traffic demands: Each traffic demand $d \in D$ can be represented by a triple $(u_d, v_d, h_d)$, where $u_d \in U$ is the traffic source (ingress router), $v_d \in V$ is the destination (egress router), and $h_d$ is the flow requirement (measured traffic).

The NMS's output is a set of paths $P_d$ for each demand d and the splitting ratios for each path. Optimizing these outputs must consider the effects of each failure state s on the paths available for demand d. Traffic splitting by ingress router $u_d$ depends only on which path(s) has (have) failed, not which failure scenario s has occurred; in fact, multiple failure scenarios may affect the same subset of paths in $P_d$. To reason about the handling of a particular demand d, a set $O_d$ of "observable" failure states can be considered, where each observable state $o \in O_d$ corresponds to a particular $P_d^o \subset P_d$ representing the available paths. For ease of expression, the function $o_d(s)$ can be mapped to the failure state observable by node $u_d$ when the network is in failure state $s \in S$. The amount of flow assigned to path p in detectable failure state $o \in O_d$ is $f_p^o$. The total flow on edge e in failure state s is $l_p^s$, and the flow on edge e corresponding to demand d is $l_{e,d}^s$.

Minimizing Congestion Over the Failure States

The NMS's goal is to compute paths and splitting ratios that minimize congestion over the range of possible failure states. A common traffic-engineering objective as discussed by B. Fortz and M. Thorup, "Increasing Internet capacity using local search", *Computational Optimization and Applications*, vol. 20, no1, pp. 13-48, 2004, and included herein by reference, is to minimize $\Sigma_{e \in E} \Phi(l_e^s/c_e)$ where $l_e$ is the load on edge e and $c_e$ is its capacity. $\Phi(\ )$ can be a convex function of link load, as discussed by B. Fortz, et al., to penalize the most congested links while still accounting for load on the remaining links. To place more emphasis on the common failure scenarios, each failure state can be associated with a weight $w^s$. To minimize congestion across the failure scenarios, the final objective function is $$\text{obj}(l_{e_1}^{s1}/c_{e_1}, \ldots) = \Sigma_{s \in S} w^s \Sigma_{e \in E} \Phi(l_e^s/c_e) \quad (1)$$

Minimizing this objective function is the goal in the following optimization problems. However, the constraints that complete the problem formulation differ depending on the functionality placed in the underlying routers.

Optimizing the Paths and Splitting Ratios

The capability of the underlying routers, in part, determines the optimization problem the NMS solves. On one extreme, the network can support an optimal configuration of paths and splitting ratios for every network failure scenario $s \in S$. While not scalable in practice, the solution to this optimization problem serves as a performance baseline and as a way to compute a suitable set of paths $P_d$ for each demand d. A more practical alternative, however, can comprise each ingress router $u_d$ storing splitting ratios for every detectable failure $o \in O_d$. After observing the path failure(s), router $u_d$ can switch to the new splitting configuration for the remaining paths. Alternatively, a single splitting configuration can be used across all failures. In this approach, router $u_d$ simply renormalizes the splitting percentages for the active paths.

Algorithms for three scenarios to be solved by the NMS are discussed. Several of the optimization problems are NP-hard (as proven in the Appendix), and resolved with heuristics (presented later in the disclosure) that achieve nearly optimal performance in practice.

Optimal Solution: Per Network Failure State

The ideal solution would compute the optimal paths and splitting ratios separately for each failure state. To avoid introducing explicit variables for exponentially many paths, the problem is formulated in terms of the amount of flow $l_{e,d}^s$ from demand d traversing edge e for failure state s. The optimal edge loads are obtained by solving the following linear program:

$$\min \text{obj}(l_{e_1}^{s1}/c_{e_1}, \ldots)$$

$$\text{s.t. } l_e^s = \Sigma_{d \in D} l_{e,d}^s \quad \forall s, e$$

$$0 = \Sigma_{i: e=(i,j)} l_{e,d}^s - \Sigma_{i: e=(j,i)} l_{e,d}^s \quad \forall d, s, j \neq u_d, v_d$$

$$h_d v = \Sigma_{i: e=(u_d, i)} l_{e,d}^s - \Sigma_{i: e=(i, u_d)} l_{e,d}^s \quad \forall d, s$$

$$0 \leq l_{e,d}^s \quad \forall d, s, e \quad (2)$$

where $l_e^s$ and is $l_{e,d}^s$ are variables. The first constraint defines the load on edge e, the second constraint ensures flow conservation, the third constraint ensures that the demands are met, and the last constraint guarantees flow non-negativity. An optimal solution can be found in polynomial time using conventional techniques for solving multicommodity flow problems.

After obtaining the optimal flow on each edge for all the failure scenarios, a standard decomposition algorithm can be used to determine the corresponding paths $P_d$ and the flow $f_p^s$ on each of them. The decomposition starts with a set $P_d$ that is empty. New unique paths are added to the set by performing the following decomposition for each failure state s. First, annotate each edge e with the value $l_{e,d}^s$. Remove all edges that have 0 value. Then, find a path connecting $u_d$ and $v_d$. If multiple such paths exist, the path p with the smallest propagation delay is used. Although any of the paths from $u_d$ to $v_d$ can be chosen, the goal is to obtain as short a path as possible. Add this path p to the set P and assign to it flow $f_p^s$ equal to the smallest value of the edges on path p. Reduce the values of these edges accordingly. Continue in this fashion, removing edges with zero value and finding new paths, until there are no remaining edges in the graph. Note that it can be shown by induction that this process completely partitions the flow $l_{e,d}^s$ into paths. The decomposition yields at most |E| paths for each network failure state s because the weight of at least one edge becomes 0 whenever a new path is found. Hence the total size of the set $P_d$ is at most |E||S|. It is difficult to obtain a solution with a tighter bound as it is proven in the Appendix that it is NP-hard to solve linear program (2) when the number of allowed paths is bounded by a constant J.

The optimal solution solves the multicommodity flow problem, computes the resulting paths, and for each failure scenario $s \in S$ assigns flow $f_p^s$ to path $p \in P_d$. However, this solution is not feasible in practice, because of the burden it imposes on the underlying routers. Each ingress router would need to store a splitting configuration for each failure scenario s. The number of failure states s can be quite large, especially when failure scenarios could involve multiple links. After a failure, the ingress router would need to learn which link(s) failed, identify the associated failure scenario s, and switch to the appropriate splitting configuration. This adds considerable complexity to the network elements.

Yet, the optimal solution is still interesting, for two reasons. First, the solution provides an upper bound on the performance of the more practical schemes, enabling one to judge how effective they are. Second, the optimal paths and splitting ratios are a useful building block in computing the network configurations in specific practical solutions.

State-Dependent Splitting: Per Detectable Failure

To reduce the complexity of the network elements, each ingress router $u_d$ can have a set of splitting ratios for each detectable failure state $o \in O_d$. Since the path-splitting ratios depend on which paths in $P_d$ have failed, the ingress router must store splitting ratios for $\min(|S|, 2^{|P_d|})$ scenarios; fortunately, the number of paths $|P_d|$ is typically small in practice. When the network performs such state-dependent splitting, the NMS's goal is to find a set of paths $P_d$ for each demand and the flows $f_p^o$ on these paths in all observable states $o \in O_d$. If the paths $P_d$ are known and fixed, the problem can be formulated as a linear program:

$$\min \text{ obj}(l_{e_1}^{s1}/c_{e_1}, \ldots) \quad (3)$$

$$\text{s.t. } l_e^s = \sum_{d \in D} \sum_{p \in P_d^o, e \in p} f_p^o \quad \forall e, s, o = o_d(s)$$

-continued $$h_d = \sum_{p \in P_d^o} f_p^o \qquad \forall d, o \in O_d$$

$$0 \le f_p^o \qquad \forall d, o \in O_d, p \in P_d$$

where $l_e^s$ and $f_p^o$ are variables. The first constraint defines the load on edge e, the second constraint guarantees that the demand d is satisfied in all detectable failure states, and the last constraint ensures non-negativity of flows assigned to the paths. The solution of the optimization problem (3) can be found in polynomial time.

The problem becomes NP-hard if the sets of paths $\{P_d\}$ are not known in advance. As shown in the Appendix, it is NP-hard even to tell if two paths that allow an ingress router to distinguish two network failure states can be constructed. Therefore, it is NP-hard to construct the optimal set of paths for all formulations that assume the sources do not have information about the network failure state s. Therefore, a simple heuristic is proposed to find the paths: Use the paths that are found by the decomposition of the optimal solution (2). This approach guarantees that the paths are sufficiently diverse to ensure traffic delivery in all failure states s. Moreover, since those paths allow optimal load balancing for the optimal solution (2), they are also likely to enable good load balancing for the optimization problem (3).

State-Independent Splitting: Across All Failure Scenarios

To further simplify the network elements, each ingress router can have a single configuration of splitting ratios that are used under any combination of path failures. Each path p is associated with a splitting fraction $\alpha_p$. When one or more paths fail, the ingress router $u_d$ renormalizes the splitting parameters for the working paths to compute the fraction of traffic to direct to each of these paths. If the network elements implement such state-independent splitting, and the paths $P_d$ are known and fixed, the problem can be formulated as a non-convex linear program:

$$\min \quad obj(l_{e_1}^{s_1}/c_{e_1}, \ldots) \qquad (4)$$

$$\text{s.t.} \quad f_p^o = h_d \frac{\alpha_p}{\sum_{p \in P_d^o} \alpha_p} \qquad \forall d, o \in O_d, p \in P_d$$

$$l_e^s = \sum_{d \in D} \sum_{p \in P_d^o, e \in p} f_p^o \qquad \forall e, s, o = o_d(s)$$

$$h_d = \sum_{p \in P} f_p^o \qquad \forall d, o \in O_d$$

$$0 \le f_p^o \qquad \forall d, o \in O_d, p \in P_d$$

where $l_e^s$, $f_p^o$ and $\alpha_p$ are variables. The first constraint ensures that the flow assigned to every available path p is proportional to $\alpha_p$. The other three constraints are the same as in (3).

Unfortunately, no standard optimization techniques compute an optimal solution efficiently, even when the paths $P_d$ are fixed. Therefore, a heuristic must be relied upon to find both the candidate paths $P_d$ and the splitting ratios $\alpha_p$. To find the set of candidate paths $P_d$, the optimal paths are obtained by decomposing an optimal solution to (2). To find the splitting ratios, the behavior of the optimal solution can be mimicked as closely as possible. The splitting ratios for all paths p can be found by letting $$\alpha_p = \sum_{s \in S} \frac{w^s f_p^s}{h_d}$$

where $F_p^s$ is the flow assigned by the optimal solution to path p in network failure state s. Since $\rho w^s = 1$, the calculated ratio is the weighted average of the splitting ratios used by the optimal solution (2).

Experimental Evaluation

The inventors of the present disclosure evaluated the algorithms described in the previous sections, by writing a simulator in C++ that calls the CPLEX linear program solver in AMPL and solves the optimization problems (2) and (3) described in the foregoing. The two heuristics were compared to the optimal solution, a simple "equal splitting" configuration, and OSPF with the link weights set using state-of-the-art optimization techniques. Finally, the two heuristics were shown to not require many paths and only a slight increase in end-to-end propagation delay was introduced.

Experimental Setup

The simulations used a variety of synthetic topologies, the Abilene topology, as well as the city-level IP backbone topology of a tier-1 ISP with a set of failures provided by the network operator. FIG. 3 shows the synthetic and realistic network topologies 300 used in experimental evaluations.

Synthetic Topologies:

The synthetic topologies include 2-level hierarchical graphs, purely random graphs, and Waxman graphs. 2-level hierarchical graphs are produced using the generator GT-ITM as described by E. W. Zegura, "GM-ITM: Georgia Tech internetwork topology models (software), 1996, and included herein by reference, for random graphs the probability of two edges being connected is constant, and the probability of having an edge between two nodes in the Waxman graph decays exponentially with the distance of the nodes. These topologies also appear in the publication by B. Fortz and M Thorup, "Optimizing OSPF/IS-IS weights in a changing World", *IEEE Journal on Selected Areas in Communications*, Vol. 20, pp. 756-767, May 2002, also include herein by reference.

Abilene Topology:

The topology of the Abilene network and a measured traffic matrix are used. The true edge capacities of 10 Gbps are used for simulation purposes.

Tier-1 IP Backbone:

The city-level IP backbone of a tier-1 ISP is used. In addition, the real link capacities, measured traffic demands and link propagation delays are also used.

The collection of network failures S for the synthetic topologies and the Abilene network contains single edge failures and the no-failure case. Two experiments with different collections of failures were performed on the tier-1 IP backbone. In the first experiment, single edge failures were used. In the second experiment, the collection of failures also contains Shared Risk Link Groups (SRLGs), link failures that occur simultaneously. SRLGs were obtained from the network operator's database that contains 954 failures with the largest failure affecting 20 links simultaneously. The failure weights $w^s$ were set to 0.5 for the no-failure case, and the other failure weights were set equal so that the sum of all the weights is 1.

The set of demands D in the Abilene network and the tier-1 backbone were obtained by sampling Netflow data measured on Nov. 15th 2005 and May 22, 2009, respectively. For the synthetic topologies, the traffic demands as outlined in the paper by B. Fortz titled "Optimizing OSPF/IS-IS weights in a changing World", and referenced earlier, were used.

To simulate the algorithms in environments with increasing congestion, all experiments were repeated several times while uniformly increasing the traffic demands. For the synthetic topologies, the demands were scaled up to twice the original values. As the average link utilization in Abilene and the tier-1 topology is lower than in the synthetic topologies, the demands were scaled in these realistic topologies up to three times the original value. The piecewise linear penalty function defined by $\Phi(0)=0$ and its derivatives was used:

$$\Phi'(l) = \begin{cases} 1 & \text{for } 0 \leq 1 < 0.333 \\ 3 & \text{for } 0.333 \leq 1 < 0.667 \\ 10 & \text{for } 0.667 \leq 1 < 0.900 \\ 70 & \text{for } 0.900 \leq 1 < 1.000 \\ 500 & \text{for } 1.000 \leq 1 < 1.100 \\ 5000 & \text{for } 1.100 \leq 1 < \infty \end{cases}$$

The penalty function was introduced in the paper by B. Fortz, titled "Increasing Internet capacity using local search," and referenced earlier. The function can be viewed as modeling retransmission delays caused by packet losses. The cost is small for low utilization, increases progressively as the utilization approaches 100%, before increasing dramatically above 110%.

The simulations calculated the objective value of the optimal solution, state-independent and state-dependent splitting, and equal splitting. Equal splitting is a variant of state-independent splitting that splits the flow evenly on the available paths. In addition, the objective achieved by the shortest path routing of OSPF with optimal link weights was calculated. These link weights were calculated using the state-of-the-art optimizations described in the paper by B. Fortz titled "Optimizing OSPF/IS-IS weights in a changing World", and referenced earlier, and these optimizations take into consideration the set of failure states S. To demonstrate that the solution does not increase the propagation delay significantly, the average propagation delay weighted by the load on the routes in the tier-1 IP backbone were calculated.

The simulations were performed using CPLEX version 11.2 on a 1.5 GHz Intel Itanium 2 processor. Solving the linear program (2) for a single failure case in the tier-1 topology takes 4 seconds, and solving the optimization (3) takes about 16 minutes. A tier-1 network operator could perform all the calculations required to obtain an optimal set of paths and router configurations for the entire city-level network topology in less than 2 hours.

Performance Evaluation

Figure 4:
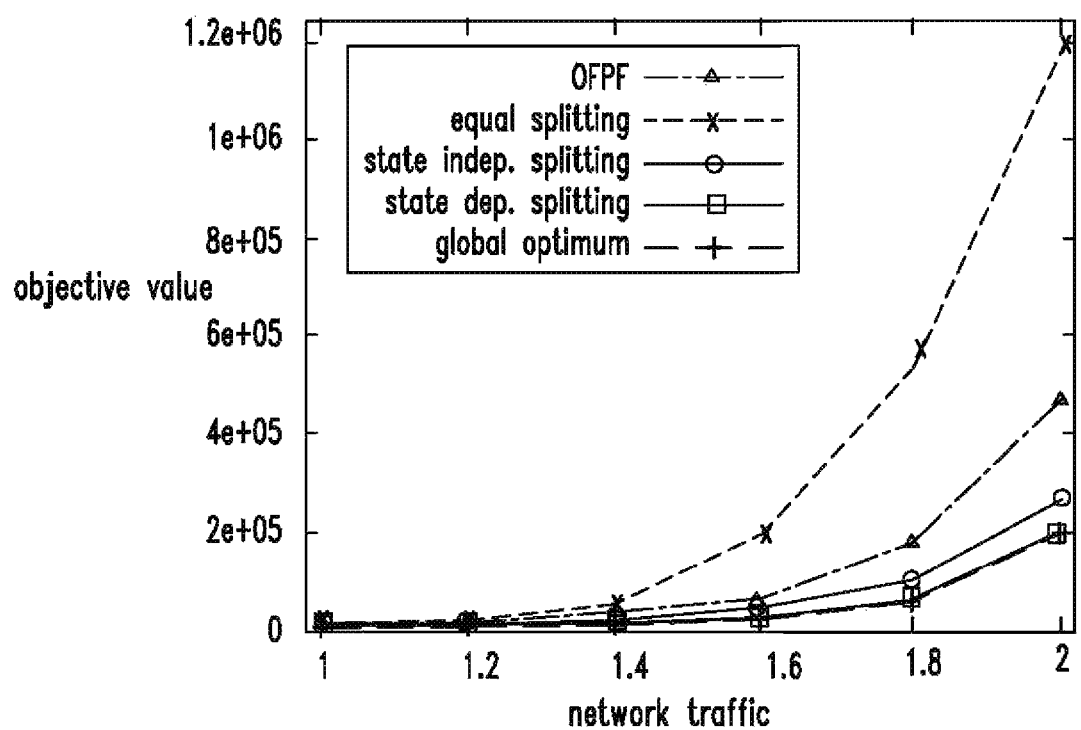
Figure 5:
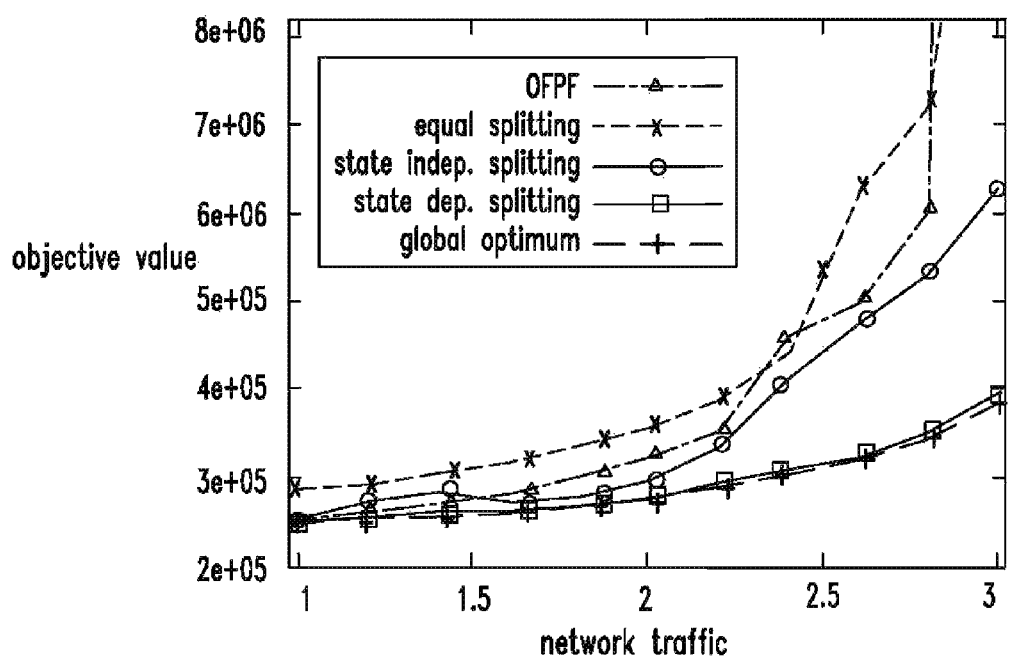
FIG. 5 shows the traffic engineering objective in the tier-1 topology with single edge failures.
Figure 6:
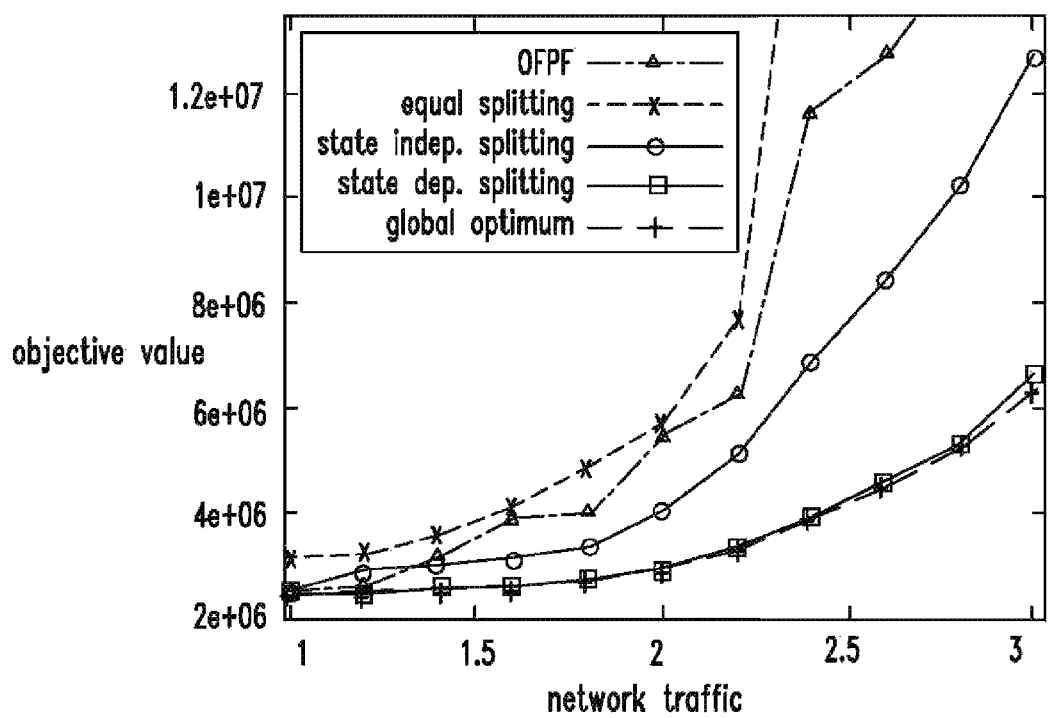
FIG. 6 shows the traffic engineering objective in the tier-1 topology with SRLGs.

Avoiding congestion and packet losses during planned and unplanned failures is the central goal of traffic engineering. The traffic engineering objective of the simulation measures congestion across all the considered failure cases. The objective as a function of the scaled-up demands are depicted in FIGS. 4-6. FIG. 4 shows the traffic engineering objective in the hierarchical topology hier 50*a*. FIG. 5 shows the traffic engineering objective in the tier-1 topology with single edge failures. FIG. 6 shows the traffic engineering objective in the tier-1 topology with SRLGs. The results which were obtained on the hierarchical and tier-1 topologies are representative, with similar observations made for all the other topologies. In FIGS. 4-6, the performance of state-dependent splitting and the optimal solution is virtually indistinguishable in all cases. State-independent splitting is less sophisticated and does not allow custom load balancing ratios for distinct failures, and therefore its performance is worse compared to the optimum. However, the performance compares well with that of OSPF. The benefit of state-independent splitting is that it uses the same set of diverse paths as the optimal solution. It is not surprising that the simple equal splitting algorithm achieved the worst performance.

It was observed that OSPF achieved a somewhat worse performance than state-independent and state-dependent splitting as the load increases. This observation was made despite the fact that a custom set of OSPF link weights were obtained for each network load evaluated. A possible explanation is that OSPF routing, in which each router splits the load evenly between the smallest weight paths, does not allow much flexibility in choosing diverse routes and does not allow uneven splitting ratios.

Figure 7:
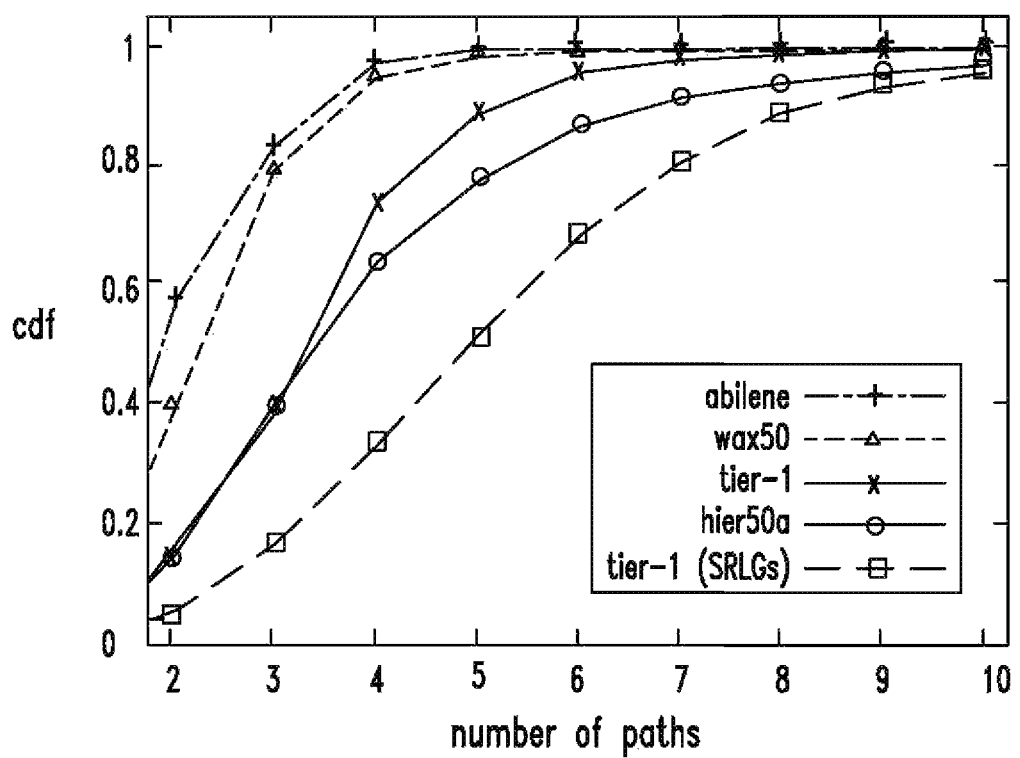
FIG. 7 shows the cdf as a function of the number of paths in various topologies.
Figure 8:
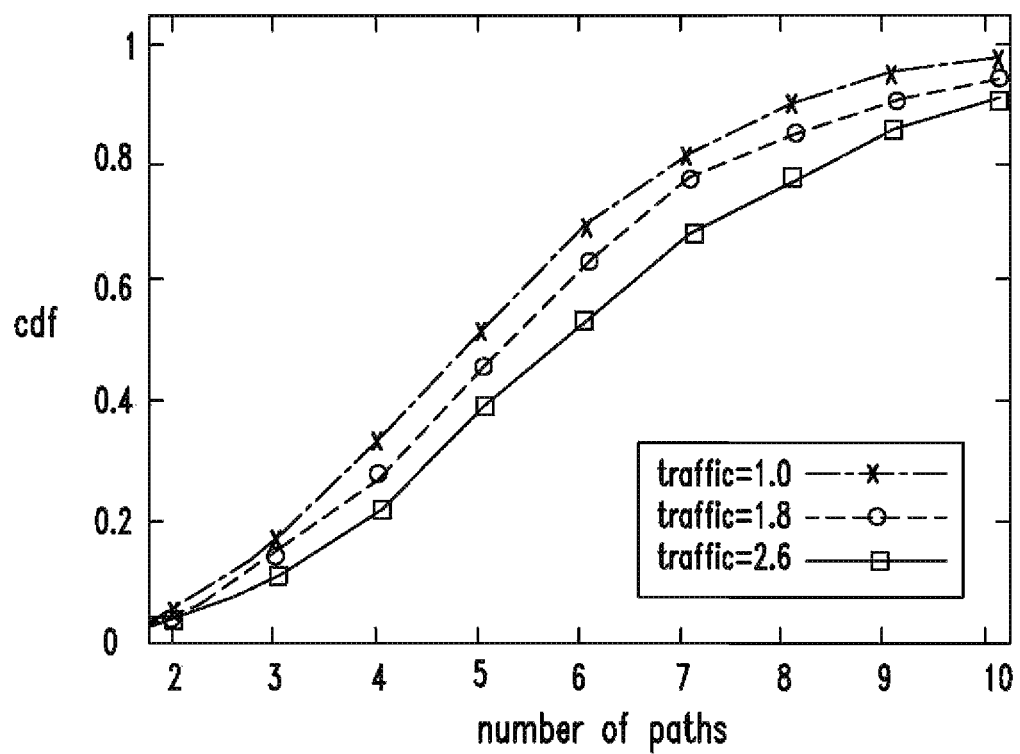
FIG. 8 shows the cdf as a function of the number of paths in the tier-1 topology with SRLGs.

Solutions with few paths are preferred as they decrease the number of tunnels that have to be managed, and reduce the size of the router configuration. However, a sufficient number of paths must be available to each commodity to avoid failures and to reduce congestion. The numbers of paths used by the algorithms were observed to be small. The cumulative distribution function (cdf) as a function of the numbers of paths used by each demand are depicted in FIGS. 7 and 8. FIG. 7 shows the cdf as a function of the number of paths in various topologies. FIG. 8 shows the cdf as a function of the number of paths in the tier-1 topology with SRLGs. Not surprisingly, the number of paths is greater for larger and more diverse topologies. 92% of the demands in the hierarchical topology use 7 or fewer paths, and fewer than 10 paths are needed in the tier-1 backbone topology for almost all demands. Additionally, FIGS. 7 and 8 show that the number of paths only increases slightly as the amount of traffic in the networks is scaled up. This small increase is caused by shifting some traffic to longer paths as the short paths become congested.

Minimizing the delay experienced by the users is one of the important goals of network operators. Therefore, the average propagation delays of all the evaluated algorithms were calculated. These results, which exclude congestion delay, are summarized in FIG. 9. The delay of OSPF with optimized link weights, state-dependent and state-independent splitting is almost identical at around 31 ms. These values would satisfy the 37 ms requirement specified in typical SLAs for tier-1 networks. These values are not significantly higher than these experienced by network users today. The simulation was repeated on the tier-1 topology using the real OSPF weights which are currently used by network operators. These values were chosen to provide a tradeoff between traffic engineering and shortest delay routing, and resulted in average delays of 28.45 and 28.49 ms for the two tier-1 failure sets.

In summary, it was observed that the objective value of state-dependent splitting very closely tracks the optimal objective. Although state-independent splitting has a somewhat worse performance especially as the network load increases beyond current levels, it is attractive due to its simplicity.

The present disclosure may be implemented using hardware, firmware, software or any combination thereof, and may be implemented in one or more computer systems and/or other processing systems. FIG. 10 is a schematic of an exemplary computer system 1000 that can be used as a network access device or a server to implement the functionality of the present disclosure. It will be appreciated by those skilled in the art that computer system 1000 may operate as a server that is networked to other computers (network access devices) to operate as a client/server system, as known by those skilled in the art, or computer 1000 may operate as a standalone system. Computer system 1000 includes one or more processors, such as processor 1004. While a single processor 1004 is shown, the presently described linear programs may advantageously be solved using a multi-core machine. Processor 1004 is connected to a communication infrastructure 1006 (e.g., a communications bus, cross-over bar, or network). Computer system 1000 can include a display interface 1002 (e.g. a graphics card) that allows graphics, text, and other data from the communication infrastructure 1006 (or from a frame buffer not shown) to be displayed on a display unit 1030. Computer system 1000 also includes a main memory 1008, preferably random access memory (RAM), and may also include a secondary memory 1010. The secondary memory 1010 may include, for example, a hard disk drive 1012 and/or a removable storage drive 1014. The removable storage drive 1014 has read/write functionality onto removable storage media 1018 having stored therein computer software and/or data. In alternative embodiments, secondary memory 1010 may include other similar devices for allowing computer programs or other instructions to be loaded into computer system 1000. Such devices may include, for example, a removable storage unit 1022 and an interface 1020. Examples of such may include a program cartridge and cartridge interface (such as that found in video game devices), a removable memory chip (such as an erasable programmable read only memory (EPROM), or programmable read only memory (PROM)) and associated socket, and other removable storage units 1022 and interfaces 1020, which allow software and data to be transferred from the removable storage unit 1022 to computer system 1000. Computer system 1000 may also include a communications interface 1024 allowing software and data to be transferred between computer system 1000 and external devices. Examples of communications interface 1024 may include a modem, a network interface (such as an Ethernet card), a communications port, a Personal Computer Memory Card International Association (PCMCIA) slot and card, etc. Software and data transferred via communications interface 1024 are in the form of signals (not shown), which may be electronic, electromagnetic, optical or other signals capable of being received by communications interface 1024. These signals are provided to communications interface 1024 via a communications path (e.g., channel) 1026. This path 1026 carries the signals and may be implemented using wire or cable, fiber optics, a telephone line, a cellular link, a radio frequency (RF) link and/or other communications channels. Computer programs (also referred to as computer control logic) are stored in main memory 1008 and/or secondary memory 1010. Computer programs may also be received via communications interface 1024. Computer programs, when executed, enable the computer system 1000 to perform the features of the present disclosure, as discussed herein. Accordingly, such computer programs represent controllers of the computer system 1000. In an embodiment where the disclosure is implemented using software, the software may be stored in a computer program product and loaded into computer system 1000 using removable storage drive 1014, hard drive 1012, or communications interface 1024. The control logic (software), when executed by the processor 1004, causes the processor 1004 to perform the functions of the disclosure as described herein. In another embodiment, the disclosure is implemented primarily in hardware using, for example, hardware components, such as application specific integrated circuits (ASICs). Implementation of the hardware state machine so as to perform the functions described herein will be apparent to persons skilled in the relevant art(s). In one exemplary embodiment, the system for the present disclosure may be implemented as a desktop application program, which may reside on a computer hard drive, database or other repository of data, or be uploaded from the Internet or other network (e.g., from a PC, mini-computer, mainframe computer, micro-computer, telephone device, PDA, or other network access device having a processor and input and/or output capability). Any available software tool capable of implementing the concepts described herein may be used to implement the system and method of the present disclosure. The method and system of the present disclosure may also be implemented as an application-specific add-on to a program, or as a standalone application.

The above-described method may be implemented by program modules that are executed by a computer, as described above. Generally, program modules include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like. The disclosure may also be employed in distributed computing environments, where tasks are performed by remote processing devices that are linked through a communications network. In a distributed computing environment, modules may be located in both local and remote memory storage devices.

An exemplary processing module for implementing the methodology above may be hardwired or stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process steps described herein. The embodiments of the present disclosure are not limited to any specific combination of hardware and software and the computer program code required to implement the foregoing can be developed by a person of ordinary skill in the art.

The term "computer-readable medium" as employed herein refers to any machine encoded medium that provides or participates in providing instructions to one or more processors. Such a medium includes but is not limited to non-volatile media, volatile media and transmission media. For example, non-volatile media can include optical or magnetic memory disks. Volatile media include dynamic random access memory (DRAM), which typically constitutes the main memory. Common expedients of computer-readable media are well-known in the art and need not be described in detail here.

The foregoing detailed description is to be understood as being in every respect illustrative and exemplary, but not restrictive, and the scope of the disclosure herein is not to be determined from the description, but rather from the claims as interpreted according to the full breadth permitted by the patent laws. It is to be understood that various modifications will be implemented by those skilled in the art, without departing from the scope and spirit of the disclosure.

APPENDIX A

In this Appendix, it is shown that two problems are NP-hard:

Failure State Distinguishing

INSTANCE: A directed graph $G=(V,E)$, a source and destination vertices $u, v \in V$, and two sets $s, s' \subset E$.

QUESTION: Is there a simple directed path P from u to v that contains edges from one and only one of the sets s and s'?

Bounded Path Load Balancing

INSTANCE: A directed graph $G=(V,E)$ with a positive rational capacity $c_e$ for each edge $e \in E$, a collection S of subsets $s \subset E$ of failure states with a rational weight $w^s$ for each $s \in S$, a set of triples $(u_d, v_d, h_d)$, $1 \le d \le k$, corresponding to demands, where $h_d$ units of demand d need to be sent from source vertex $u_d \in U$ to destination vertex $v_d \in V$, an integer bound J on the number of paths that can be used between any source-destination pair, a piecewise-linear increasing cost function $\Phi(l)$ mapping edge loads/to rationals, and an overall cost bound B.

QUESTION: Are there J (or fewer) paths between each source-destination pair such that the given demands can be partitioned between the paths in such a way that the total cost (sum of $\Phi(l)$ over all edges and weighted failure states as described in the foregoing disclosure) is B or less?

To prove that a problem X is NP-hard, it must be shown that for some known NP-hard problem Y, any instance y of Y can be transformed into an instance x of X in polynomial time, with the property that the answer for y is yes if and only if the answer for x is yes. Both problems can be proven NP-hard by transformations from the following problem, proven NP-hard by S. Fortune, J. Hopcroft, and J. Wyllie, "The directed subgraph homeomorphism problem", *Theor. Comput. Sci*,. Vol. 10, No. 2, pp. 111-121, 1980, included herein by reference.

Disjoint Directed Paths

INSTANCE: A directed graph $G(V,E)$ and distinguished vertices $u_1, v_1, u_2, v_2 \in V$.

QUESTION: Are there directed paths $P_1$ from $u_1$ to $v_1$ and $P_2$ from $u_2$ to $v_2$ such that $P_1$ and $P_2$ are vertex-disjoint?

Theorem 1: The FAILURE STATE DISTINGUISHING problem is NP-hard.

Proof. Given an instance $G=(V,E), u_1, v_1, u_2, v_2$ of DISJOINT DIRECTED PATHS. The constructed instance of FAILURE STATE DISTINGUISHING consists of the graph $G'=(V,E')$, where $E'=E \cup \{(v_1, u_2)\}$, with $u=u_1$, $v=v_2$, $s=\emptyset$, and $s'=\{(v_1, u_2)\}$. Given this choice of s and s', a simple directed path from u to v that distinguishes the two states must contain the edge $(v_1, u_2)$. Such a path is claimed to exist if and only if there are vertex-disjoint directed paths $P_1$ from $u_1$ to $v_1$ and $P_2$ from $u_2$ to $v_2$. Suppose a distinguishing path P exists. Then it must consist of three segments: a path $P_1$ from $u=u_1$ to $v_1$, the edge $(v_1, u_2)$, and then a path $P_2$ from $u_2$ to $v=v_2$. Since it is a simple path, $P_1$ and $P_2$ must be vertex-disjoint. Conversely, if vertex-disjoint paths $P_1$ from $u_1$ to $v_1$ and $P_2$ from $u_2$ to $v_2$ exist, then the path P that concatenates $P_1$ followed by $(v_1, u_2)$ followed by $P_2$ is the desired distinguishing path.

Theorem 2: The BOUNDED PATH LOAD BALANCING problem is NP-hard even if there are only two commodities (k=2), only one path is allowed for each (J=1), and there is only one failure state s.

Proof. For this result, the variant of DISJOINT DIRECTED PATHS in used where the edge-disjoint is asked for rather than vertex-disjoint paths. The NP-hardness of this variant is easy to prove, using a construction in which each vertex x of G is replaced by a pair of new vertices $in_x$ and $out_x$, and each edge $(x,y)$ is replaced by the edge $(out_x, in_y)$.

Given an instance $G=(V,E), u_1, v_1, u_2, v_2$ of the edge-disjoint variant of DISJOINT DIRECTED PATHS. The constructed instance of BOUNDED PATH LOAD BALANCING is based on the same graph, with each edge e given capacity $c_e=1$, with the single failure state $s=\emptyset$ (i.e., the state with no failures), with $w^s=1$, and with demands represented by the triples $(u_1, v_1, 1)$ and $(u_2, v_2, 1)$. The cost function $\Phi$ has derivative $\Phi'(l)=1$, $0 \le l \le 1$, and $\Phi'(l)=|E|$, $l>1$. The target overall cost bound is $B=|E|$.

Note that if the desired disjoint paths exist, then $P_1$ can be use to send the required unit of traffic from $u_1$ to $v_1$, and $P_2$ to send the required unit of traffic from $u_2$ to $v_2$. Since the paths are edge-disjoint, no edge will carry more than one unit of traffic, so the cost per edge used will be 1, and the total number of edges used can be at most $|E|$. Thus the specified cost bound $B=|E|$ can be met. On the other hand, if no such pair of paths exist, then paths $P_1$ and $P_2$ must be chosen that share at least one edge, which will carry two units of flow, for an overall cost of at least $|E|+1$, just for that edge. Thus if there is a solution with cost $|E|$ or less, the desired disjoint paths must exist.

It is not difficult to see that adding more paths, failure states, or commodities do not make the problem easier. Note, however, that this does not imply that the problem for the precise cost function $\Phi$ discussed in the present disclosure is NP-hard. It does, however, mean that, assuming P≠NP, any efficient algorithm for that $\Phi$ would have to exploit the particular features of that function.

We claim:

1. A method for balancing load in a network after failure of a link, the network comprising a plurality of interconnected vertices and edges and a set of traffic demands, each demand defining a flow requirement from an ingress router to an egress router, the network further comprising a set of failure states, the method comprising:

at the ingress router, routing traffic by automatically balancing traffic load over a predefined set of paths from the ingress router to the egress router according to a set of splitting ratios, each splitting ratio defining a fraction of the demands to be transmitted over a path of the predefined set of paths in a case of a detectable failure state corresponding to a subset of a modeled set of the failure states, the modeled set of the failure states being states that cause at least one path of the predefined set of paths to fail, the modeled set of the failure states including a no-failure state in which the network has no failures, each modeled failure state having a predetermined probability of occurrence; and in an off-line management system, pre-computing the predefined paths and the splitting ratios, wherein pre-computing the splitting ratios further comprises solving a linear program having an objective function defining congestion over the modeled set of the failure states, the objective function including a factor comprising a sum of weights for each of the modeled set of the failure states to emphasize common failure states.

2. The method of claim 1, wherein the objective function includes a factor comprising a sum of convex functions of link loads for each of the edges in the modeled set of the failure states.

3. The method of claim 1, wherein the predetermined probability of occurrence is sufficient to meet a predetermined network availability objective when the network is restored against the set of modeled failure states.

4. The method of claim 1, wherein the step of pre-computing the fixed paths further comprises:

obtaining an optimal flow on each edge for all modeled failure states; and using a decomposition algorithm to compute the corresponding fixed paths through the network.

5. The method of claim 1, wherein solving the objective function is subject to a constraint requiring that a load on an edge for a failure state equals a sum of flows assigned to all paths including the edge in all observable states.

6. The method of claim 1, wherein solving the objective function is subject to a constraint requiring that the flow requirement for each of the demands equals a sum of the flows assigned to all paths of that demand in all observable states.

7. The method of claim 1, wherein solving the objective function is subject to a constraint requiring that flows assigned to the predefined set of paths are greater than zero.

8. The method of claim 1, wherein solving the objective function further comprises:

finding a splitting ratio for each path as a sum, over the set of failure states, of an optimal flow for a path of the failure state times the weight for that failure state divided by the flow requirement.

9. The method of claim 1, further comprising:

storing, at the ingress router, the set of fixed paths and the set of splitting ratios, by populating at least one forwarding table in the ingress router.

10. The method of claim 1, further comprising:

storing, at the ingress router, the set of fixed paths and the set of splitting ratios, by configuring the ingress router to signal the paths using a resource reservation protocol.

11. A communications network comprising:

a plurality of interconnected vertices and edges;

a set of traffic demands, each demand defining a flow requirement from an ingress router to an egress router;

a set of failure states; and an off-line management system;

the ingress router comprising a processor and non-transitory computer-readable medium having computer readable instructions stored thereon for execution by the processor to perform operations to balance load in the network after failure of a link, the operations comprising: routing traffic by automatically balancing traffic load over a predefined set of paths from the ingress router to the egress router according to a set of splitting ratios, each splitting ratio defining a fraction of the demands to be transmitted over a path of the predefined set of paths in a case of a detectable failure state corresponding to a subset of a modeled set of the failure states, the modeled set of the failure states being states that cause at least one path of the predefined set of paths to fail, the modeled set of the failure states including a no-failure state in which the network has no failures, each modeled failure state having a predetermined probability of occurrence; and the off-line management system comprising a processor and non-transitory computer-readable medium having computer readable instructions stored thereon for execution by the processor to perform operations comprising: pre-computing the predefined paths and the splitting ratios, wherein pre-computing the splitting ratios further comprises solving a linear program having an objective function defining congestion over the modeled set of the failure states, the objective function including a factor comprising a sum of weights for each of the modeled set of the failure states to emphasize common failure states.

12. The communications network of claim 11, wherein the objective function includes a factor comprising a sum of convex functions of link loads for each of the edges in the modeled set of the failure states.

13. The communications network of claim 11, wherein the predetermined probability of occurrence is sufficient to meet a predetermined network availability objective when the network is restored against the set of modeled failure states.

14. The communications network of claim 11, wherein the operation of pre-computing the fixed paths further comprises:

obtaining an optimal flow on each edge for all modeled failure states; and using a decomposition algorithm to compute the corresponding fixed paths through the network.

15. The communications network of claim 11, wherein solving the objective function is subject to a constraint requiring that a load on an edge for a failure state equals a sum of flows assigned to all paths including the edge in all observable states.

16. The communications network of claim 11, wherein solving the objective function is subject to a constraint requiring that the flow requirement for each of the demands equals a sum of the flows assigned to all paths of that demand in all observable states.

17. The communications network of claim 11, wherein solving the objective function is subject to a constraint requiring that flows assigned to the predefined set of paths are greater than zero.

18. The communications network of claim 11, wherein solving the objective function further comprises:

finding a splitting ratio for each path as a sum, over the set of failure states, of an optimal flow for a path of the failure state times the weight for that failure state divided by the flow requirement.

19. The communications network of claim 11, the operations performed by the ingress router further comprising:

storing the set of fixed paths and the set of splitting ratios, by populating at least one forwarding table in the ingress router.

20. The communications network of claim 11, the operations performed by the ingress router further comprising:

storing the set of fixed paths and the set of splitting ratios, by configuring the ingress router to signal the paths using a resource reservation protocol.

* * * * *